(12) United States Patent
Favela et al.

(10) Patent No.: US 10,740,074 B2
(45) Date of Patent: Aug. 11, 2020

(54) CONDITIONAL CONSTRUCT SPLITTING FOR LATENCY HIDING

(71) Applicant: ADVANCED MICRO DEVICES, INC., Santa Clara, CA (US)

(72) Inventors: Brian J. Favela, Boxborough, MA (US); Todd Martin, Orlando, FL (US); Robert A. Gottlieb, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 41 days.

(21) Appl. No.: 16/227,741

(22) Filed: Dec. 20, 2018

(65) Prior Publication Data

US 2020/0174761 A1     Jun. 4, 2020

Related U.S. Application Data

(60) Provisional application No. 62/773,534, filed on Nov. 30, 2018.

(51) Int. Cl.
*G06F 8/41* (2018.01)
*G06T 1/20* (2006.01)

(52) U.S. Cl.
CPC . *G06F 8/41* (2013.01); *G06T 1/20* (2013.01)

(58) Field of Classification Search
CPC .................................. G06F 8/41; G06T 1/20
See application file for complete search history.

(56) References Cited

U.S. PATENT DOCUMENTS 6,964,029 B2 * 11/2005 Poznanovic ............ G06F 30/30
                                                              716/105
7,548,238 B2 *  6/2009 Berteig ................... G06T 15/80
                                                              345/426

(Continued)

FOREIGN PATENT DOCUMENTS

CN        104217393 B  *  7/2019  ........... G06F 9/3838
WO  WO-2007005739 A2  *  1/2007  ........... G06T 15/005
WO  WO-2017007557 A1  *  1/2017  ........... G06F 9/3009

OTHER PUBLICATIONS

Crawford et al., "A Cross-platform Evaluation of Graphics Shader Compiler Optimization", 2018, IEEE (Year: 2018).*

(Continued)

*Primary Examiner* — Wei Y Zhen
*Assistant Examiner* — Junchun Wu (57) ABSTRACT

A method and system for compiler optimization includes analyzing a representation of source code to identify an original conditional construct having both a high-latency instruction and one or more instructions dependent on the high-latency instruction in a branch of the conditional construct. A set of one or more instructions following the conditional construct in the representation of source code and independent of the high-latency instruction is selected. An optimized representation of the source code is generated, whereby the optimized representation replaces the original conditional construct with a first split conditional construct positioned prior to the selected set of one or more instructions and a second split conditional construct positioned following the selected set of one or more instructions, The method further includes generating an executable representation of the source code based on the optimized representation of the source code.

20 Claims, 5 Drawing Sheets

(56) References Cited

U.S. PATENT DOCUMENTS

| | | | | |
|---|---|---|---|---|
| 7,800,620 | B2* | 9/2010 | Tarditi, Jr. | G06F 8/45 |
| | | | | 345/505 |
| 8,464,217 | B2* | 6/2013 | Janczewski | G06F 8/314 |
| | | | | 717/116 |
| 9,436,451 | B2* | 9/2016 | State | G06F 9/4881 |
| 10,037,198 | B2* | 7/2018 | Stanfill | G06F 8/41 |
| 10,242,494 | B2* | 3/2019 | Surti | G06T 15/80 |
| 2008/0034356 | A1* | 2/2008 | Gschwind | G06F 8/445 |
| | | | | 717/149 |
| 2013/0318510 | A1* | 11/2013 | Blainey | G06F 8/443 |
| | | | | 717/151 |
| 2016/0035128 | A1* | 2/2016 | Zhao | G06T 1/20 |
| | | | | 345/522 |
| 2016/0350968 | A1* | 12/2016 | Rosasco | G06F 9/45516 |
| 2017/0010894 | A1* | 1/2017 | Nalluri | G06F 9/30072 |
| 2018/0286115 | A1* | 10/2018 | Surti | G06F 9/5038 |
| 2019/0244418 | A1* | 8/2019 | Surti | G06T 5/20 |

OTHER PUBLICATIONS

Lefohn et al., "A GPU-Based, Three-Dimensional Level Set Solver with Curvature Flow", Dec. 2002, University of Utah (Year: 2002).*
Fung et al., "Dynamic Warp Formation and Scheduling for Efficient GPU Control Flow", 2007, IEEE (Year: 2007).*
Lattner et al., "LLVM: A Compilation Framework for Lifelong Program Analysis & Transformation", 2004, IEEE (Year: 2004).*
Roy et al., "StructSlim: A Lightweight Profiler to Guide Structure Splitting", Mar. 2016, ACM (Year: 2016).*
Carrillo, Snaider, et al., "A Control-Structure Splitting Optimization for GPGPU", Proceedings of the 6th ACM Conference on Computing Frontiers, May 18-20, 2009, 4 pages.

* cited by examiner

CONDITIONAL CONSTRUCT SPLITTING FOR LATENCY HIDING

CROSS-REFERENCE TO RELATED APPLICATIONS

The present application claims priority to U.S. Provisional Patent Application Ser. No. 62/773,534, entitled "Conditional Construct Splitting for Latency Hiding" and filed on Nov. 30, 2018, the entirety of which is incorporated by reference herein.

BACKGROUND

Shaders or other software compiled for execution at graphics processing units (GPUs) or similar processors frequently execute relatively high-latency operations, such as fetching data stored at location in memory. When a high-latency instruction and an instruction that is dependent on completion of the high-latency instruction are both implemented in an If-Then construct, If-Then-Else, or other conditional construct, considerable delay is introduced as execution of the workload stalls until the high-latency operation completes. To illustrate, if an If-Then construct includes an instruction to fetch data from a memory address and then an instruction that uses that fetched data, the instructions following the if-then-else construct cannot execute until the fetch has completed and the dependent instruction in the construct likewise has completed execution with the fetched data. As the typical lower-latency instruction may take only a few cycles on average to complete compared to the hundreds or thousands of cycles needed to complete a high-latency operation like a fetch operation, the stall while waiting for the fetch operation in this example precludes tens, if not hundreds, of other instructions from being executed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Software programs having conditional constructs with a high-latency instructions and one or more instructions dependent on the high-latency instruction ("dependent instructions") introduce considerable delay due to the stall induced while waiting for the high-latency instruction to finish execution. To reduce the impact of such conditional constructs, systems and methods are described herein for a compiler optimization based on conditional construct splitting. In at least one embodiment, the conditional construct splitting technique includes a compiler, such as the shader compiler of a driver for a graphics processing unit (GPU), identifying in a source code, bytecode, or other representation of the shader or other program being compiled a conditional construct having a conditional expression followed by a branch that includes both an instruction that, when executed, will incur a relatively high latency ("the high-latency operation" or "the high-latency instruction"), as well as one or more subsequent instructions that are dependent on the high-latency instruction (each such instruction being identified herein as "a dependent operation" or "a dependent instruction"), with a conditional construct having this characteristic being identified herein as a "high-latency conditional construct." In response to identifying a high-latency conditional construct, the compiler determines whether there is a set of one or more instructions following the latency-dependent conditional construct (that is, the same if-then-else part) that are not dependent on instructions of the branch of the conditional construct that includes the high-latency instruction and its one or more dependent instructions, with these instructions being identified herein as "independent instructions."

If so, the compiler optimizes the program by splitting the original high-latency conditional construct into two separate conditional constructs: a first split conditional construct that includes the conditional expression and the high-latency instruction in its conditional statement; and a second split conditional construct that includes the same conditional expression and the one or more dependent instructions in its conditional statement. The compiler then inserts the identified set of non-dependent instructions between the first split conditional construct and the second split conditional construct in program order, such that when the resulting compiled, executable code is executed, the first split conditional construct is executed, and thus initiating the high-latency operation. Then, while the high-latency operation is underway, the set of independent instructions can execute in parallel with the high-latency operation. With completion of the high-latency operation and with completion of execution of the set of independent instructions, the second split conditional construct is executed, including execution of the one or more dependent instructions utilizing the result of the high-latency operation. Thus, because this conditional construct split avoids the stall that otherwise would occur while the one or more dependent instructions await completion of the high-latency operation, some or all of the latency incurred by the high-latency instruction and the one or more dependent instructions may be mitigated, or "hidden", by facilitating execution of non-dependent operations in the interim. This latency-hiding technique is particularly effective in, for example, single wave execution shaders/cores or in shaders/cores that operate relatively quickly and don't have considerable overlap, and thus typically are unable to take advantage of conventional implicit-latency-negation techniques involving rotating in other waves/threads when the currently-executing wave/thread is stalled due to a high-latency operation.

In the following, the systems and techniques of the present disclosure are described using terminology and nomenclature in accordance with an OpenGL™ specification and a compile-time optimization for compute shaders for a GPU or other processor employing single instruction-multiple data (SIMD) execution. However, the concepts and techniques of the embodiments described herein are not limited to any specific application programming interface (API) or programming language, nor are they limited to a particular processor architecture. For example, the concepts and techniques are also applicable for other APIs including OpenGL™, DirectX™, or CUDA™ or any other language or API, as well as being applicable for compiler optimization for other processor architectures, such as superscalar or multiple-core central processing units (CPUs) or other multiple instruction-multiple data (MIMD) architectures.

Figure 1:
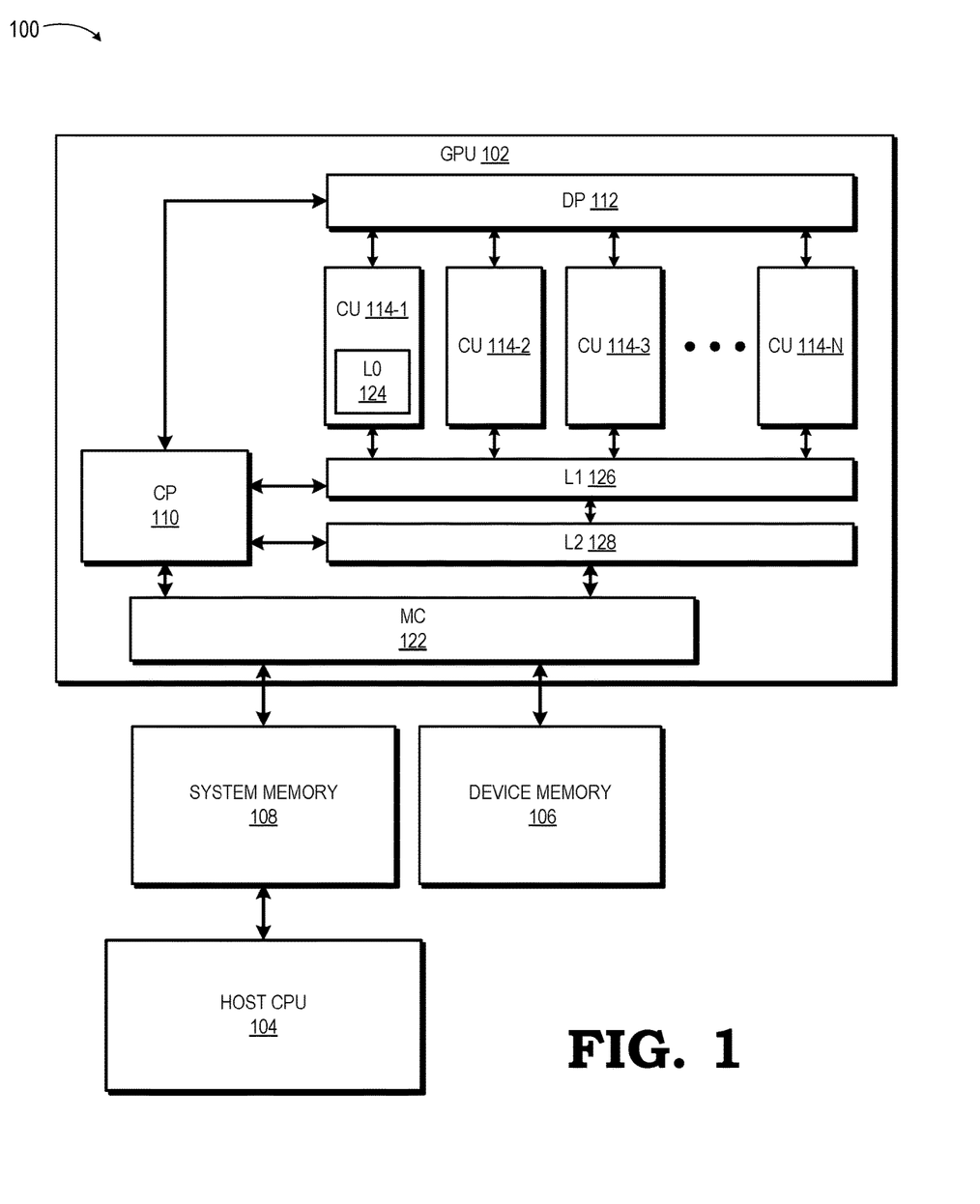
FIG. 1 is a block diagram of a processing system employing a conditional construct splitting optimization technique in accordance with some embodiments.

FIG. 1 illustrates a processing system 100 that employs compiler optimization based on conditional construct splitting for latency hiding in accordance with at least one embodiment. The processing system 100 includes a GPU 102, a host CPU 104, a device memory 106 utilized by the GPU 102, and a system memory 108 shared by the GPU 102 and the host CPU 104. The memories 106, 108 include any of a variety of random access memories or combinations thereof, such as a double-data-rate dynamic random access memory (DDR DRAM), a graphics DDR DRAM (GDDR DRAM), and the like.

In the depicted embodiment, the GPU 102 includes a command processor (CP) 110, a dispatch processor (DP) 112, a plurality of compute units (CU) 114 (numbered 114-1, 114-2, 114-3, and 114-N), a memory management subsystem 116, and a register file 118. The memory management subsystem 116 includes an address translation cache hierarchy 120 and a memory controller 122 for managing address translation operations for one or both of the memories 106, 108. The memory management subsystem 116 further includes a cache hierarchy including one or more levels of data and instruction caching, such as a private level 0 (L0) cache 124 at each compute unit 114, a shared level 1 (L1) cache 126, and a shared level 2 (L2) cache 128.

Figure 2:
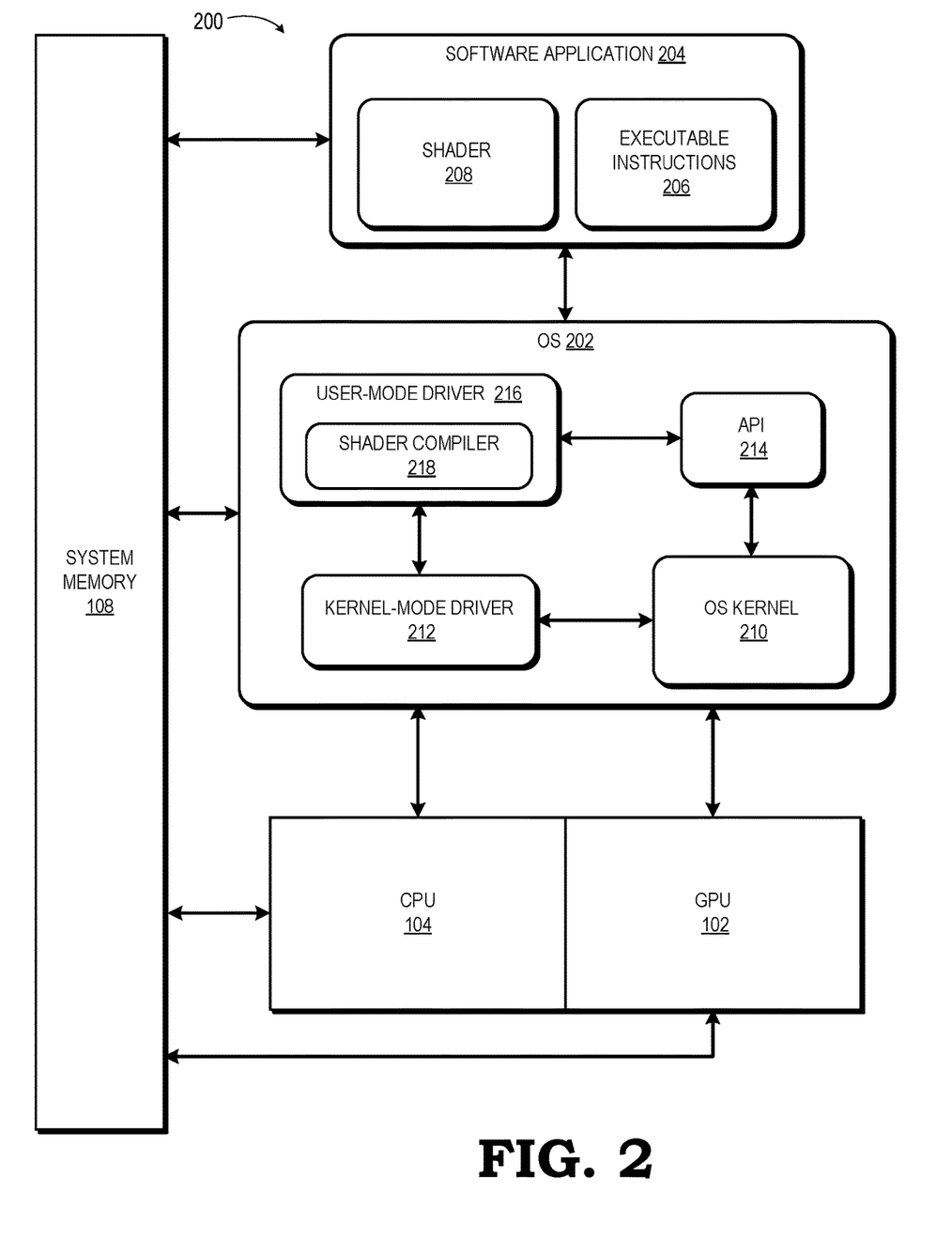
FIG. 2 is a diagram of a software architecture of the processing system of FIG. 1 in accordance with some embodiments.

FIG. 2 illustrates an example software architecture 200 employed in the processing system 100 of FIG. 1 in accordance with some embodiments. The software architecture 200 includes an operating system (OS) 202 that supports execution of one or more software applications 204 by the host CPU 104 and GPU 102 in concert. The OS 202 and software application 204 typically are resident in the system memory 108, as is much of the data utilized by the host CPU 104 and some of the data utilized by the GPU 102 (with the device memory 106 serving to store certain GPU-specific data, such as frame buffer data in a graphics rendering implementation).

The software application 204 includes one or more sets of executable instructions 206 as well as one or more shaders 208. The set of executable instructions 206 represent one or more programs that have been compiled into machine language code suitable for execution at the host CPU 104. Each shader 208 (also commonly known as a "compute kernel") is a program representing a task or workload intended to be executed at least partially by the GPU 102, and typically with multiple instances of the shader 208 being executed in parallel by two or more of the CUs 114 of the GPU 102. Such shaders may be graphics-related, such as pixel shaders, vertex shaders, geometry shaders, tessellation shaders, and the like, or may be general compute shaders.

The OS 202 includes an OS kernel 210, one or more kernel-mode drivers 212, one or more application programming interfaces (APIs) 214, and one or more user-mode drivers 216. The OS kernel 210 represents the functional core of the OS 202 and is responsible for boot initialization, memory allocation/deallocation, input/output control, and other fundamental hardware controls, as well as facilitating execution of the software application 204. The kernel-mode driver 212 manages the general operation of the hardware of the GPU 102, including initialization of the GPU 102, setting display modes, managing mouse hardware, managing allocation/deallocation of physical memory for the GPU 102, managing the command buffer (not shown) in the system memory 108 that facilitates tasking of commands from the host CPU 104 to the GPU 102, and the like.

The user-mode driver 216 operates as the interface to the GPU 102 for the one or more shaders 208 of the software application 204. However, to facilitate hardware abstraction, the shader 208 typically is not implemented in the software application 204 as machine readable code (i.e., "native" code), but rather as source code (that is, in a human readable syntax), such as OpenGL™ Shading Language (GLSL) or High Level Shading Language (HLSL) syntax, or in partially compiled bytecode, such as the Standard Portable Intermediate Representation (SPIR) bytecode format, and which rely on one or more APIs 214, such as an OpenCL™ API, an OpenGL™ API, a Direct3D™ API, a CUDA™ API, and the like, and their associated libraries. As the shader 208 is not in native code format, the user-mode driver 216 employs a shader compiler 218 that operates to perform run time compilation (also known as real time compilation or just-in-time (JIT) compilation) of the source code or bytecode representation of the shader 208 to machine readable code executable by the GPU 102. In other embodiments, an offline compiler is employed to compile the code representing the shader 208 into executable native code. The compiled executable code representation of the shader 208 is then provided by the user-mode driver 216 to the GPU 102 via a command buffer (not shown) implemented in the system memory 108 and managed by the CP 110.

Figure 3:
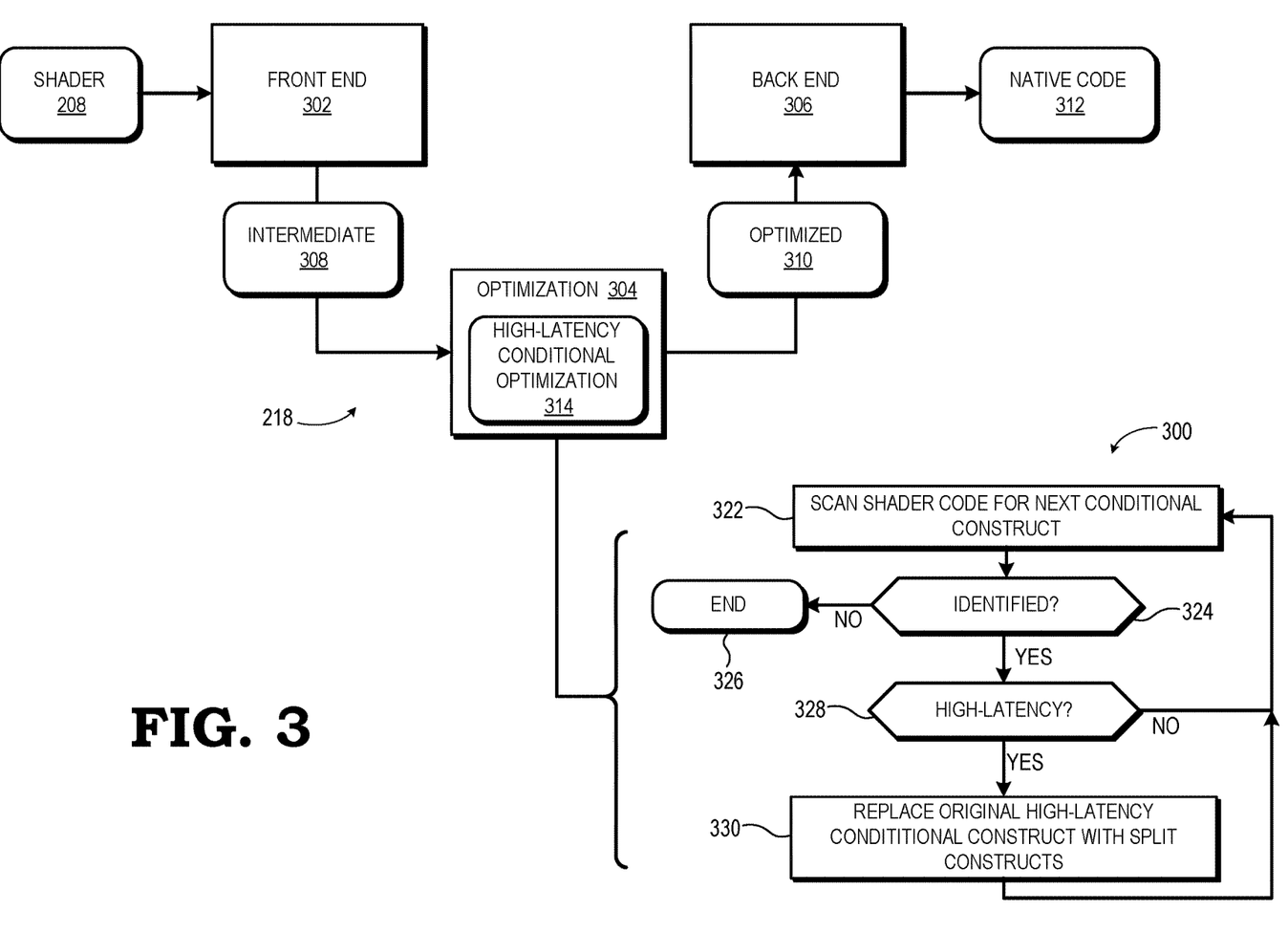
FIG. 3 is a flow diagram of a shader compilation method that employs conditional construct splitting for latency hiding in accordance with some embodiments.

FIG. 3 illustrates an example implementation of the shader compiler 218 and an example method 300 of its operation with a compiler optimization based on conditional construct splitting in accordance with some embodiments. In the depicted implementation, the shader compiler 218 includes a set of instructions to manipulate the host CPU 104 to perform a set of tasks when executed, with these set of tasks logically organized as a front end stage 302, an optimization stage 304, and a back end stage 306. The shader 208 is provided to the front end stage 302 in the form of human-readable source code or in partially compiled byte-code, depending on implementation. The front end stage 302 then performs one or more initial preparatory processes, such as lexical, syntactic, and semantic analyses, and then generates an intermediate representation 308 of the shader 208, which may include, for example, converting the human-readable source code to byte code or converting from a higher-level shader language to a lower-level shader language. At the optimization stage 304, the shader compiler 218 applies one or more optimization techniques to the intermediate representation 308 so as to generate an optimized representation 310. The optimized representation 310 is then processed by the back end stage 306, which translates the optimized representation 310 to one or more shader objects represented in the machine language of the GPU 102 and links the one or more objects so as to create an executable machine-language representation of the shader program, identified herein as "native code shader 312". The native code shader 312 then may be passed on to the GPU 102 via a command buffer in memory 108, whereupon the CP 110 directs one or more of the CUs 114 to execute the executable shader representation, that is, the native code shader 312, in parallel.

Often, the shader 208, and thus the native code shader 312, include a conditional construct that contains in the same branch following the conditional expression an instruction that incurs a relatively-high latency (that is, a "high-latency instruction") as well as one or more instructions that depend on completion of execution of the high-latency instruction before being themselves capable of initiating execution (that is, "dependent instructions"). One typical example is an "if" conditional expression that includes in one branch a fetch operation that, when executed by the CU 114, triggers a memory operation to access certain data from the system memory 108 or the device memory 106, followed by one or more instructions that use this fetched data (that is, are directly dependent on the high-latency instruction), or use data that was generated or modified based on this fetched data (that is, are indirectly dependent on the high-latency instruction), such as an instruction that modifies the data so fetched. In such instances, because both occur within the same branch following the conditional expression, execution of a conventional shader will stall while waiting for the fetch to complete so that the one or more dependent instructions can initiate instruction with the fetched data. As a memory operation to fetch data can take hundreds or even thousands of cycles, such stalls can significantly impact the overall efficiency and throughput in executing the shader. To illustrate, assuming the fetch operation in the example above requires, for example 300 cycles, and the typical non-high-latency instruction requires, for example, 4 cycles to execute, a stall to wait for a high-latency instruction to complete prevents at least 70 typical non-high-latency instructions from being executed as a result of the stall.

To mitigate the impact of the latency incurred by such high-latency instructions, in at least one embodiment the optimization stage 304 employs a high-latency conditional construct splitting optimization technique 314 (hereinafter "splitting optimization technique 314") in optimizing the compiled native code shader 312 for execution. Method 300 illustrates an embodiment of the splitting optimization technique 314. At block 322, the shader compiler 218 scans or otherwise analyzes the intermediate representation 308 of the shader 208 in program order to identify the next conditional construct present in the intermediate representation 308. If at block 324 the shader compiler 218 has not identified a next (or a first) conditional construct in the intermediate representation 308, at block 326 the method 300 terminates.

Otherwise, if the shader compiler 218 has identified a conditional construct, at block 328 the shader compiler 218 determines whether the identified conditional construct is a high-latency conditional construct. In at least one embodiment, a high-latency conditional construct is a conditional construct that includes both a high-latency instruction and at least one instruction dependent on the high-latency instruction within the same branch from the conditional expression of the conditional construct. To illustrate, for a conditional construct in the form of "If (Boolean expression), then [A], else B", the "If (Boolean expression)" constitutes the conditional expression, "then A" represents one branch from the conditional expression (that is, the branch taken if Boolean expression=true), and "else [B]" represents another branch from the conditional expression (that is, the branch taken if Boolean expression=false). Thus, if the one or more instructions represented in [A] include a high-latency instruction and at least one dependent instruction, or if the one or more instructions represented in [B] include a high-latency instruction and at least one dependent instruction, then the conditional construct may be identified as a high-latency conditional construct.

The identification of an instruction as a "high-latency instruction" may be configured in any of a variety of ways. In one embodiment, high-latency instructions are identified by type of instruction or type of operation, with the shader compiler 218 either being hard-coded to identify certain instruction types or operation types as high-latency instructions or having access to a list or other data structure that can be programmed or otherwise configured to specify which instruction types/operation types are to be considered to be high-latency instructions. To illustrate, all fetch operations or other instructions that consistently trigger memory access operations may be categorized by the shader compiler 218 as high-latency instructions. Other examples of instructions that could be categorized as high-latency operations include image instructions (e.g., a specific type of fetch operation), buffer loads (scalar or vector), global data store (GDS) instructions, local data store (LDS) instructions, and the like. In other embodiments, rather than, or in addition to, using a pre-defined list of high-latency instruction types, the shader compiler 218 analyzes each instruction during the compilation process and determines an estimate of the number of cycles that will be necessary to complete execution of the operation represented by the instruction, and from this estimated number of cycles determine whether the instruction is a high-latency instruction (e.g., by comparing the estimated number of instructions to a threshold).

If the conditional construct identified at the current iteration of block 322 does not meet the criteria for being a high-latency conditional construct, the method 300 returns to block 322 for identification of the next conditional construct, if any, in the intermediate representation 308. Otherwise, if the conditional construct is identified as a high-latency conditional construct, then at block 330 the shader compiler 218 replaces the identified high-latency conditional construct with two split conditional constructs in the resulting optimized representation 310, as described in greater detail below. The process of method 300 then returns to block 322 for another iteration with the next conditional construct in the intermediate representation 308, if any.

Figure 4:
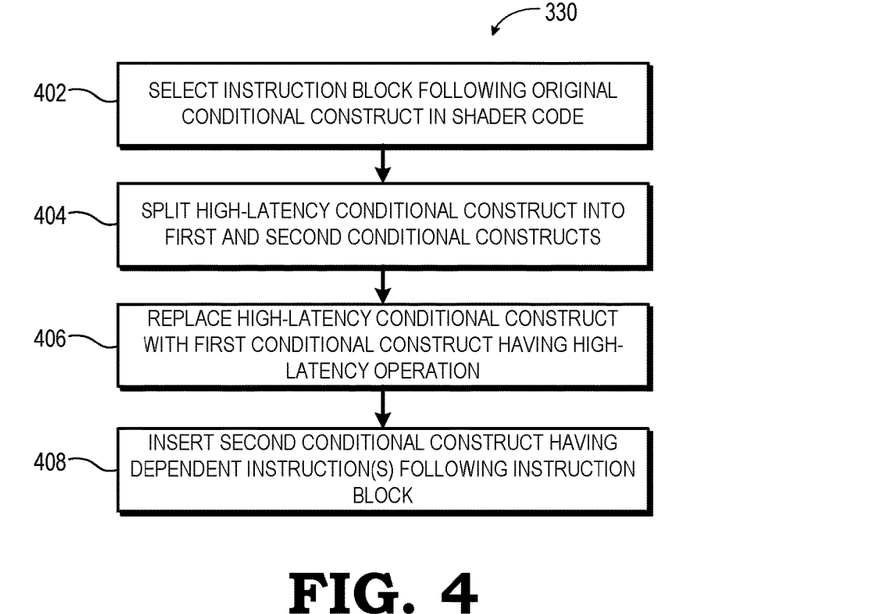
FIG. 4 is a flow diagram illustrating a technique for compilation optimization using conditional construct splitting in accordance with some embodiments.

FIG. 4 illustrates the process for generating split conditional constructs from the original high-latency conditional construct as represented by block 330 of method 300 in accordance with at least one embodiment. The splitting process begins at block 402 with the shader compiler 218 selecting an independent instruction block of one or more instructions of the intermediate representation 308 of the shader following the identified high-latency conditional construct in program order, wherein the one or more instructions of the independent instruction block are independent of the high-latency instruction of the high-latency conditional construct being optimized (that is, do not rely directly or indirectly on a result of the high-latency instruction). The number of instructions from the intermediate representation 308 can be set based on any of a variety of factors. To illustrate, as described below, the independent instruction block represents instructions of the shader 208 that are executed while the high-latency operation represented by the high-latency instruction is being executed, and thus in some embodiments the number of instructions to include in the independent instruction block may be based on the expected duration of execution of the high-latency instruction and the expected total duration required to execute the instructions of the independent instruction block. To illustrate, in the event that the shader compiler 218 has information regarding the specific latency to be incurred by the high-latency instruction as well as information regarding the specific execution latency of each instruction being considered for inclusion in the independent instruction block, or information regarding an average latency for such instructions, the shader compiler 218 may select the size of the independent instruction block so that the time needed to execute the independent instruction block is approximately equal to the expected latency of the high-latency instruction (that is, the expected amount of time needed to execute the high-latency instruction). In other embodiments, a fixed upper threshold for the size of the independent instruction block is set. This fixed upper threshold may be stored in a register of the host CPU 104 or otherwise programmable, or may be hardcoded in the software implementing the shader compiler 218.

With the independent instruction block identified, at block 404 the shader compiler 218 splits the high-latency conditional construct into two conditional constructs, both with the same conditional expression as the high-latency conditional construct. However, the first split conditional construct includes the high-latency instruction and excludes any instructions of the high-latency conditional construct that depend, directly or indirectly, on the completion or result of the high-latency instruction. Conversely, the second split conditional construct includes any such instructions that depend on the completion or result of the high-latency instruction, but exclude the high-latency instruction itself. Any other instructions of the high-latency conditional construct that are not dependent on the high-latency instruction (that is, are independent instructions) may be included in the first split conditional construct or the second split conditional construct.

Generally, the approach of the conditional construct splitting optimization technique 314 is to split a high-latency conditional constructs into two conditional constructs that avoid stalling due to the high-latency instruction by allowing the independent instruction block to execute while the high-latency operation represented by the high-latency instruction is being performed in parallel. Accordingly, in generating the optimized representation 310 the shader compiler 218 replaces the original high-latency conditional construct by inserting the first split conditional construct having the high-latency instruction in the location of the original high-latency conditional construct (that is, preceding the independent instruction block in program order) in the optimized representation 310 at block 406, and by inserting the second split conditional construct having the one or more dependent instructions following the last instruction of the independent instruction block in program order in the optimized representation 310 at block 408. Thus, in program order, the optimized representation has the following sequence: first split conditional construct→independent instruction block→second split conditional construct.

Figure 5:
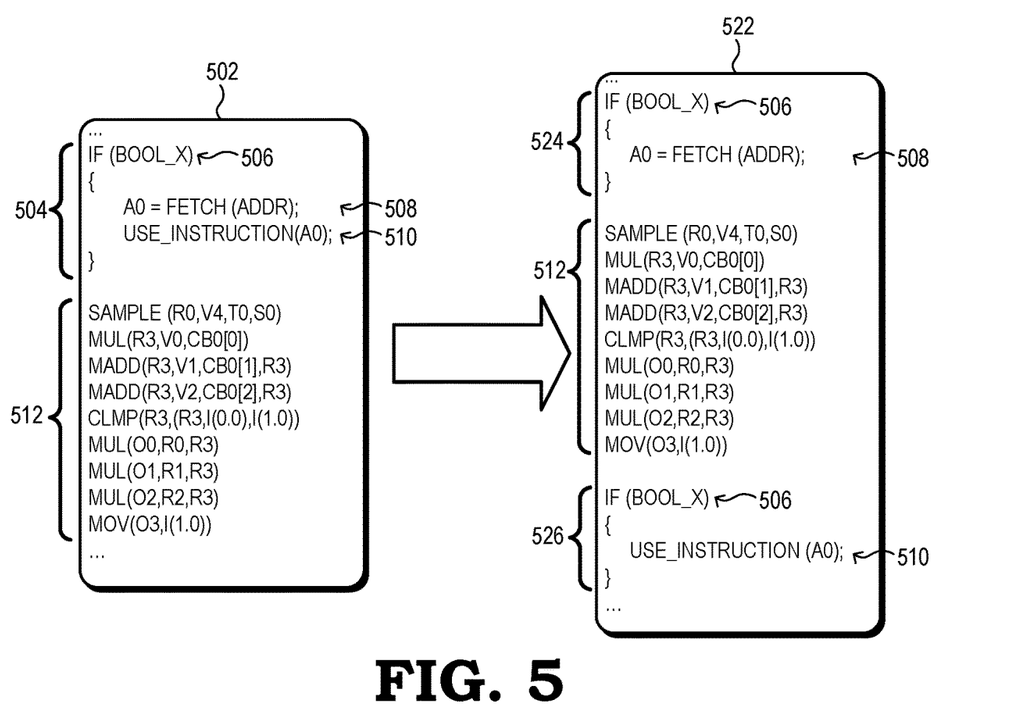
FIG. 5 is a diagram illustrating an example of the technique of FIG. 4 in accordance with some embodiments.

FIG. 5 illustrates an example of this high-latency conditional construct splitting technique. Code segment 502 represents a segment of code of the intermediate representation 308 of the shader 208 that includes a high-latency conditional construct 504 followed by a series of instructions in program order. The high-latency conditional construct 504 includes the conditional expression 506 "IF(BOOL_X)" and a "then" branch that includes a high-latency instruction 508 and a set of one or more dependent instructions 510. In the illustrated example, the high-latency instruction 508 is a fetch instruction to fetch data from memory at address ADDR and store it in a variable A0 and the set of one or more dependent instructions 510 is a routine or function call to a set of instructions that perform some operation using the variable A0, represented as USE_INSTRUCTION(A0). After identifying the conditional construct 504 as a high-latency conditional construct, per block 402 of FIG. 4, the shader compiler 218 selects the nine illustrated instructions immediately following the conditional construct 504 in program order as an independent instruction block 512 (noting that none of these selected instructions are dependent, directly or indirectly, on variable A0 and thus independent of the high-latency instruction 508).

Optimized code segment 522 represents the optimized representation of the code segment 502 as found in the optimized representation 310. As depicted, the shader compiler 218 splits the high-latency conditional construct 504 into a first split conditional construct 524 and a second split conditional construct 526. The first split conditional construct 524 includes the conditional expression 506 and the high-latency instruction 508 in its "then" branch, but excludes the one or more dependent instructions 510. The second split conditional construct 526 includes the same conditional expression 506 and includes the one or more dependent instructions 510, but excludes the high-latency instruction 508. As shown by optimized code segment 522, the first split conditional construct 524 and second split conditional construct 526 together replace the original high-latency conditional construct 504, but with the first split conditional construct 524 in the original position preceding the independent instruction block 512 and the second split conditional construct 526 following the independent instruction block 512 in program order in the optimized code segment 522.

Figure 6:
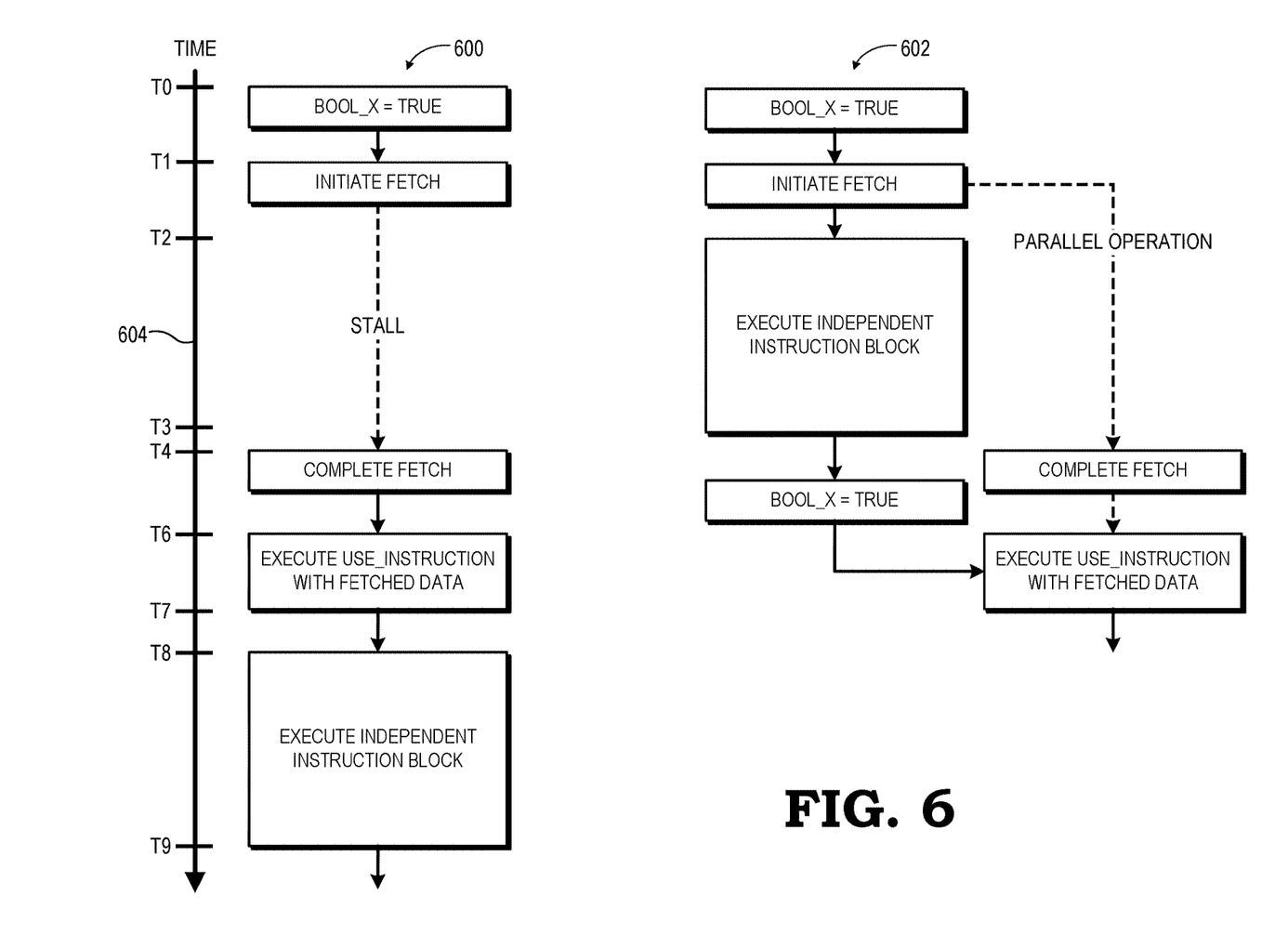
FIG. 6 is a diagram illustrating a timeline comparison between a shader code segment having an unsplit conditional construct configuration and the same shader code segment but with a split conditional construct configuration in accordance with some embodiments.

FIG. 6 illustrates a comparison of an execution time of the unoptimized code segment 502 to an execution time of the optimized code segment 522 in the example of FIG. 5. As illustrated, diagram 600 represents the execution of unoptimized code segment 502 and diagram 602 represents the execution of optimized code segment 522 relative to time axis 604. In diagrams 600, 602, the dimension of the box representing the execution of a corresponding operation or set of operations approximates the time or duration required to execute the operation or set of operations.

As shown by diagram 600, when executing the unoptimized code segment 502, at time T0 the GPU 102 executes the operation representing the conditional expression 506 in the high-latency conditional construct 504 and, finding the expression to be true, initiates a fetch operation for execution of the high-latency instruction 508 at time T1. Because the next instruction in the branch is the set of dependent instructions 510 which depend on the result of the fetch operation, execution of the unoptimized code segment 502 is stalled until the fetch operation completes at time T4, which is hundreds or thousands of cycles after initiation of the fetch operation at time T1. With the fetch operation completed and the fetched data available, execution of the set of dependent instructions 510 (representing, e.g., the instruction USE_INSTRUCTION(A0)) in the high-latency conditional construct 504 is initiated by the GPU 102 at time T6. Following completion of execution of the operations represented by this set of dependent instructions 510, at time T8 execution of the first instruction in independent instruction block 512 initiates and subsequently at time T9 execution of the last instruction of the independent instruction block 512 terminates. As such, the total time required to execute unoptimized code segment 502 is the time span between time T0 and T9.

Turning to diagram 602, when executing the optimized code segment 522, at time T0 the GPU 102 executes the operation representing the conditional expression 506 in the first split conditional construct 524 and, finding the expression to be true, initiates a fetch operation for execution of the high-latency instruction 508 in the first split conditional construct 524 at time T1. However, because the branch in the first split conditional construct 524 does not include any instructions dependent on the high-latency instruction 508, the program flow can exit the first split conditional construct 524 while the fetch operation is underway. Thus, at time T2 the GPU 102 initiates execution of the first instruction of the independent instruction block 512 and at time T3 the GPU 102 completes execution of the last instruction of the independent instruction block 512. In this example, it is assumed that execution of the entire independent instruction block 512 takes less time than performing the fetch operation, and thus time T3 is less than time T4 (that is, when the fetch operation completes). At time T5, the GPU 102 executes the operation representing the conditional expression 506 in the second split conditional construct 526 and, finding the expression to be true, with the fetch operation completed at the fetched data available, at time T6 the GPU 102 initiates execution of the set of dependent instructions 510 (representing, e.g., USE_INSTRUCTION(A0)) in the second split conditional construct 526. Execution of this set of dependent instructions 510 terminates at time T7. As such, the total time required to execute optimized code segment 522 is the time span between time T0 and T7. Thus, because in this example it is assumed that the execution time for the independent instruction block 512 is less than the latency of the fetch operation incurred when executing the high-latency instruction 508, the optimization technique described herein effectively "hides" the latency of the high-latency conditional construct by allowing the independent instruction block 510 to execute while the fetch operation proceeds, and thus allowing resulting optimized code segment 522 to complete execution at least X cycles sooner than execution of the unoptimized code segment 502 would require, where X represents the number of cycles required to execute the independent instruction block 512.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. Such non-transitory computer readable storage media can include, for example, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method for source code optimization during compilation, the method comprising:
analyzing a representation of source code to identify an original conditional construct having both a high-latency instruction and one or more instructions dependent on the high-latency instruction in a branch of the original conditional construct;
selecting a set of one or more instructions following the original conditional construct in the representation of source code and which are independent of the high-latency instruction;
generating an optimized representation of the source code, the optimized representation replacing the original conditional construct with a first split conditional construct positioned prior to the selected set of one or more instructions and a second split conditional construct positioned following the selected set of one or more instructions, wherein:
the first split conditional construct includes a conditional expression of the original conditional construct and the high-latency instruction and excludes any of the one or more instructions dependent on the high-latency instruction from the original conditional construct; and
the second split conditional construct includes the conditional expression of the original conditional construct and the one or more instructions dependent on the high-latency instruction and excludes the high-latency instruction; and generating an executable representation of the source code based on the optimized representation of the source code.

2. The method of claim 1, wherein analyzing the representation of source code to identify the original conditional construct includes:
identifying an instruction of the original conditional construct as a high-latency instruction based on a comparison of a type of operation represented by the instruction to a set of specified high-latency types of operations.

3. The method of claim 2, wherein the set of specified high-latency types of operations is programmable.

4. The method of claim 1, wherein selecting the set of one or more instructions includes selecting a number of instructions from the representation of source code that is based on a predefined threshold number.

5. The method of claim 1, wherein selecting the set of one or more instructions includes selecting a number of instructions from the representation of source code that is based on an expected latency of an operation represented by the high-latency instruction.

6. The method of claim 1, wherein:
the source code represents a shader;
generating the optimized representation and generating the executable representation comprises generating the optimized representation and the executable representation at a shader compiler of a driver of a central processing unit (CPU); and
the method further comprises:
executing the executable representation of the source code at a graphics processing unit (GPU).

7. The method of claim 1, further comprising:
executing the executable representation of the source code at a first processor.

8. The method of claim 7, wherein:
the optimized representation and the executable representation are generated at a second processor different than the first processor.

9. The method of claim 8, wherein the second processor generates the optimized representation and the executable representation at run time.

10. A processing system comprising:
a memory configured to store a representation of source code; and
a first processor coupled to the memory and configured to:
analyze a representation of source code to identify an original conditional construct having both a high-latency instruction and one or more instructions dependent on the high-latency instruction in a branch of the original conditional construct;
select a set of one or more instructions following the original conditional construct in the representation of source code and which are independent of the high-latency instruction; and
generate an optimized representation of the source code, the optimized representation replacing the original conditional construct with a first split conditional construct positioned prior to the selected set of one or more instructions and a second split conditional construct positioned following the selected set of one or more instructions, wherein:
the first split conditional construct includes a conditional expression of the original conditional construct and the high-latency instruction and excludes any of the one or more instructions dependent on the high-latency instruction from the original conditional construct; and
the second split conditional construct includes the conditional expression of the original conditional construct and the one or more instructions dependent on the high-latency instruction and excludes the high-latency instruction; and
generate an executable representation of the source code based on the optimized representation of the source code.

11. The processing system of claim 10, wherein the first processor is configured to analyze the representation of source code to identify the original conditional construct by:
identifying an instruction of the original conditional construct as a high-latency instruction based on a comparison of a type of operation represented by the instruction to a set of specified high-latency types of operations.

12. The processing system of claim 11, wherein the set of specified high-latency types of operations is programmable.

13. The processing system of claim 10, wherein the first processor is configured to select for the set of one or more instructions a number of instructions from the representation of source code that is based on a predefined threshold number.

14. The processing system of claim 10, wherein the first processor is configured to select for the set of one or more instructions a number of instructions from the representation of source code that is based on an expected latency of an operation represented by the high-latency instruction.

15. The processing system of claim 10, wherein:
the source code represents a shader;
the first processor is a central processing unit (CPU) configured to execute a shader compiler of a driver to generate the optimized representation and to generate the executable representation; and
the processing system further includes:
a graphics processing unit (GPU) coupled to the CPU, the GPU configured to execute the executable representation of the source code.

16. The processing system of claim 10, further comprising:
a second processor configured to execute the executable representation of the source code.

17. The processing system of claim 10, wherein the first processor is configured to generate the optimized representation and the executable representation at run time.

18. A non-transitory computer readable medium embodying a set of executable instructions, the set of executable instructions to manipulate at least one processor to:
analyze a representation of source code to identify an original conditional construct having both a high-latency instruction and one or more instructions dependent on the high-latency instruction in a branch of the original conditional construct;
select a set of one or more instructions following the original conditional construct in the representation of source code and which are independent of the high-latency instruction; and
generate an optimized representation of the source code, the optimized representation replacing the original conditional construct with a first split conditional construct positioned prior to the selected set of one or more instructions and a second split conditional construct positioned following the selected set of one or more instructions, wherein:
the first split conditional construct includes a conditional expression of the original conditional construct and the high-latency instruction and excludes any of the one or more instructions dependent on the high-latency instruction from the original conditional construct; and the second split conditional construct includes the conditional expression of the original conditional construct and the one or more instructions dependent on the high-latency instruction and excludes the high-latency instruction; and generate an executable representation of the source code based on the optimized representation of the source code.

19. The non-transitory computer readable medium of claim 18, wherein:

the source code represents a shader configured to be executed at a graphics processing unit (GPU);

the at least one processor includes a central processing unit (CPU); and the set of executable instructions are part of a shader compiler of a driver configured to be executed at the CPU.

20. The non-transitory computer readable medium of claim 19, wherein the shader compiler is configured to generate the optimized representation and generate the executable representation at run time.

* * * * *